United States Patent
Lee et al.

(10) Patent No.: US 8,248,474 B2
(45) Date of Patent: Aug. 21, 2012

(54) SURVEILLANCE SYSTEM AND SURVEILLING METHOD

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 296 days.

(21) Appl. No.: 12/647,429

(22) Filed: Dec. 25, 2009

(65) Prior Publication Data

US 2011/0115917 A1     May 19, 2011

(30) Foreign Application Priority Data

Nov. 13, 2009   (CN) .......................... 2009 1 0309673

(51) Int. Cl.
*H04N 5/225* (2006.01)
*H04N 7/00* (2011.01)
*G06K 9/00* (2006.01)

(52) U.S. Cl. .......................... 348/159; 348/36; 382/118

(58) Field of Classification Search .................. None
See application file for complete search history.

(56) References Cited

U.S. PATENT DOCUMENTS

| | | | | |
|---|---|---|---|---|
| 7,466,866 B2* | 12/2008 | Steinberg | | 382/243 |
| 7,505,074 B2* | 3/2009 | Yoshino et al. | | 348/333.11 |
| 7,684,630 B2* | 3/2010 | Steinberg | | 382/243 |
| 8,050,465 B2* | 11/2011 | Ianculescu et al. | | 382/118 |
| 2004/0223058 A1* | 11/2004 | Richter et al. | | 348/207.1 |
| 2006/0187305 A1* | 8/2006 | Trivedi et al. | | 348/169 |
| 2008/0019565 A1* | 1/2008 | Steinberg | | 382/103 |
| 2008/0019661 A1* | 1/2008 | Obrador et al. | | 386/52 |
| 2008/0037838 A1* | 2/2008 | Ianculescu et al. | | 382/118 |
| 2009/0003708 A1* | 1/2009 | Steinberg et al. | | 382/190 |
| 2009/0046157 A1* | 2/2009 | Cilia et al. | | 348/207.1 |
| 2010/0110275 A1* | 5/2010 | Mathieu | | 348/360 |

* cited by examiner

*Primary Examiner* — Peling Shaw
*Assistant Examiner* — Joiya M Cloud
(74) *Attorney, Agent, or Firm* — Altis Law Group, Inc.

(57) ABSTRACT

A surveillance system includes two cameras and a processing unit. The two cameras capture a scene to obtain a low resolution image and a high resolution image. The processing unit checks the low resolution image to find a reference image in the low resolution image to determine coordinates of the reference image in the low resolution image. The processing unit further determines coordinates of the reference image in the high resolution image to select a portion in the second image correspondingly. The processing unit crops and resizes an image size of the selected reference image according to a ratio of an image size between the low resolution image and the high resolution image, and replaces the reference image in the low resolution image with the cropped and resized reference image to obtain a new image. The new image is for being identified.

8 Claims, 7 Drawing Sheets

SURVEILLANCE SYSTEM AND SURVEILLING METHOD

BACKGROUND

1. Technical Field

The present disclosure relates to a surveillance system and a surveilling method.

2. Description of Related Art

For identifying whether a person is a person of special interest accurately, conventional surveillance systems may include cameras with high resolution. Cameras with high resolution may obtain large images. It takes longer time to transmit the large images, vis-à-vis small images, from the cameras to a processing system. In addition, it takes longer time to process the large images for the processing system.

DETAILED DESCRIPTION

Figure 1:
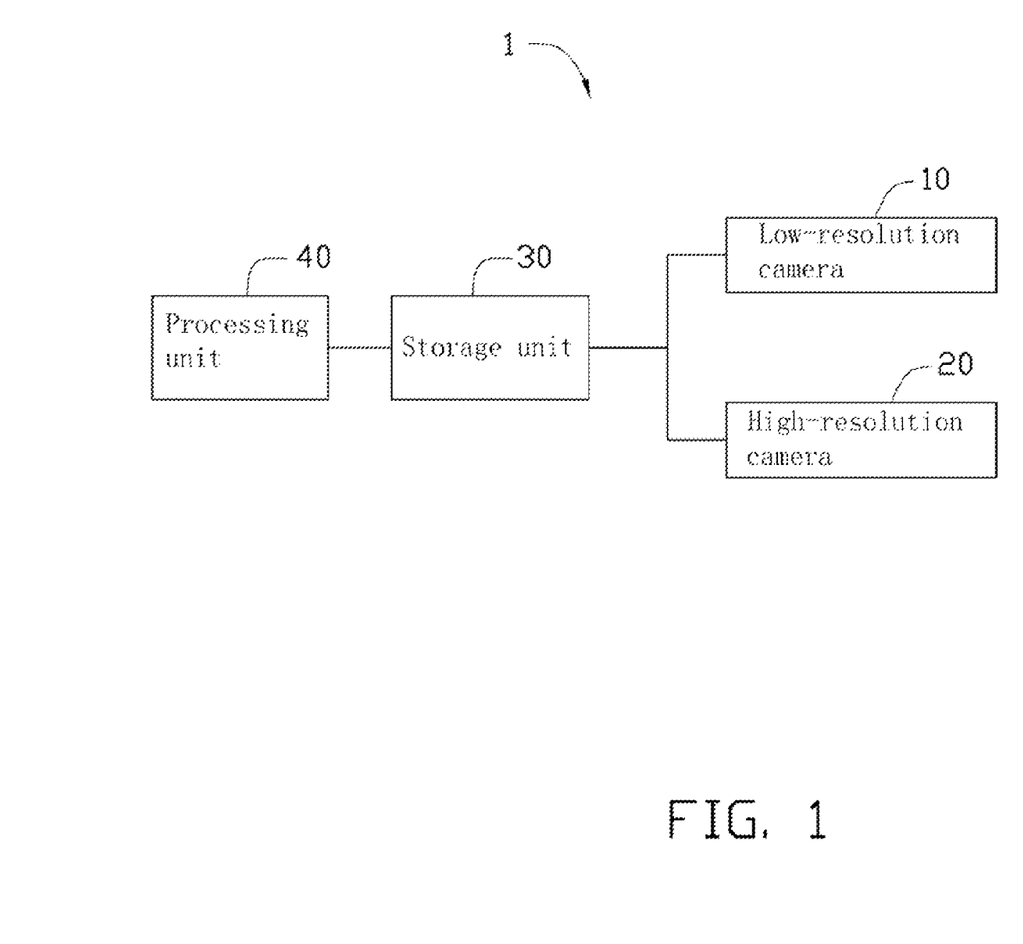
FIG. 1 is a schematic block diagram of an exemplary embodiment of a surveillance system including a first camera, a second camera, a storage unit, and a processing unit.

Referring to FIG. 1, an exemplary embodiment of a surveillance system 1 includes a low-resolution camera 10, a high-resolution camera 20, a storage unit 30, and a processing unit 40. The surveillance system 1 is operable to identify whether a person that the low-resolution camera 10 and the high-resolution camera 20 captured is a person of special interest quickly.

The low-resolution camera 10 and the high-resolution camera 20 captures images simultaneously, to obtain a low resolution image and a high resolution image respectively. In addition, an image size of the low resolution image is smaller than an image size of the high resolution image.

Figure 2:
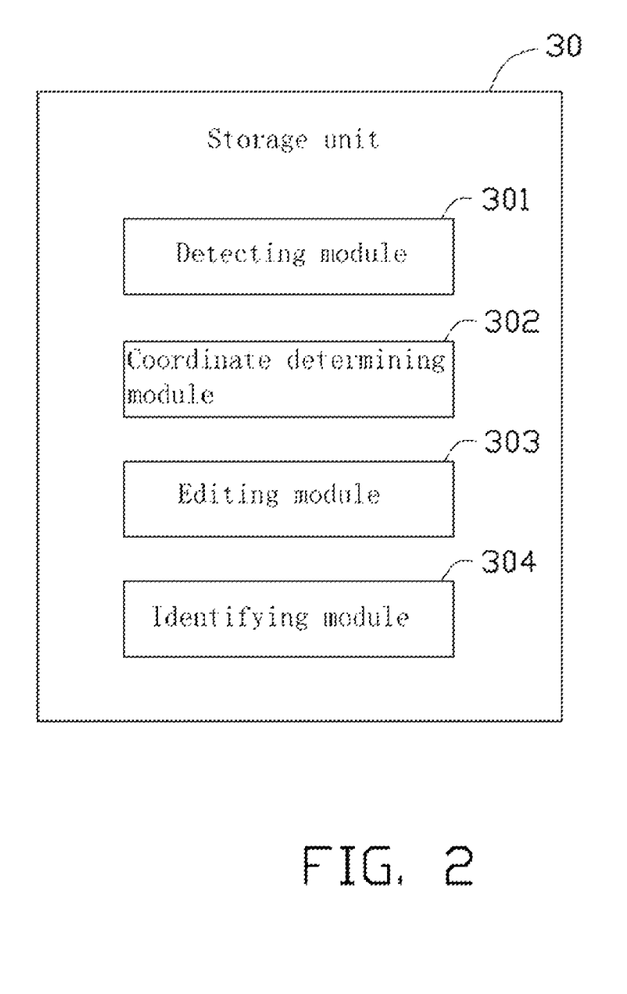
FIG. 2 is a schematic block diagram of the storage unit of FIG. 1, the storage unit including a detecting module.

Referring to FIG. 2, the storage unit 30 includes a detecting module 301, a coordinate determining module 302, a editing module 303, and an identifying module 304. The detecting module 301, the coordinate determining module 302, the editing module 303, and the identifying module 304 may include one or more computerized instructions and are executed by the processing unit 40.

The detecting module 301 checks the low resolution image to identify a reference image in the low resolution image. It can be understood the reference image is a part of the low resolution image. In the embodiment, the detecting module 301 may be a face detecting module, and the reference image may be a facial image in the low resolution image. The detecting module 301 checks the low resolution image to identify the facial image in the low resolution image. It can be understood that the face detecting module uses well known facial recognition technology to find the facial image in the low resolution image. In other embodiments, the detecting module 301 may be a license plate detecting module, and the reference image may be a license plate in the low resolution image.

The coordinate determining module 302 calculates the reference image in the low resolution image, to determine coordinates of the reference image in the low resolution image. The coordinate determining module 302 further determines coordinates of a reference image in the high resolution image. In the embodiment, because the low resolution image and the high resolution image have same content but different image size, the determining module 302 may multiply the coordinates of the reference image in the low resolution image with a ratio of the image size between the low resolution image and the high resolution image, to obtain the coordinates of the reference image in the high resolution image. For example, supposing that coordinates of centers of the low resolution image and the high resolution image are (0, 0), and the high resolution image is two times bigger than the low resolution image in the image size. If the coordinates of the reference image in the low resolution image are (1, 1), (1, −1), (−1, −1), and (−1, 1), the coordinates of the reference image in the high resolution images are (2, 2), (2, −2), (−2, −2), and (−2, 2).

The editing module 303 selects the reference image in the high resolution image according to the coordinates of the reference image in the high resolution image from the coordinate determining module 302, and crops and resizes the reference image according to the ratio of the image size between the low resolution image and the high resolution image. Thus the cropped reference image has a same image size with the reference image in the low resolution image. The cropped reference image is used to replace a part of the low resolution image which refers to a the reference image in the low resolution image to obtain a new image. It can be understood that a part of the new image is same as the cropped reference image, and the other part is same as the low resolution image without the reference image. As a result, a reference image in the new image has a high resolution, and other parts in the new image have a low resolution.

The identifying module 304 identifies the reference image in the new image. For example, the identifying module 304 compares the reference image in the new image with a standard image stored in advance, to determine whether the reference image in the new image is different from a reference image in the standard image. It can be understood that the identifying module 304 uses well known technology to determine whether two images are different. For example, the identifying module 304 compares pixel values of the two images, to determine whether the two images are different.

Figure 3:
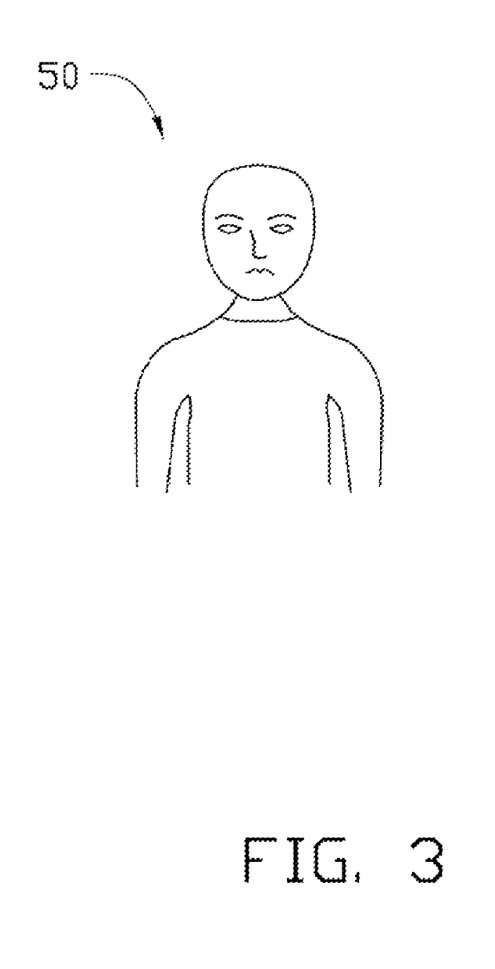
FIG. 3 is a schematic diagram of a scene.
Figure 4A:
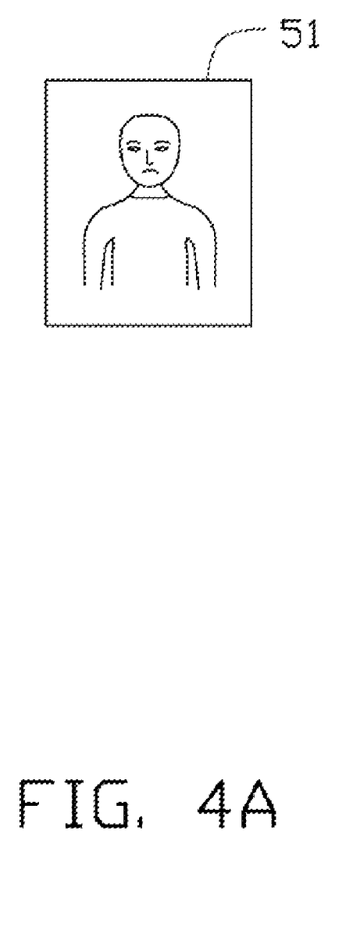
FIGS. 4A and 4B are schematic diagrams of images captured by the first and second cameras respectively.
Figure 4B:
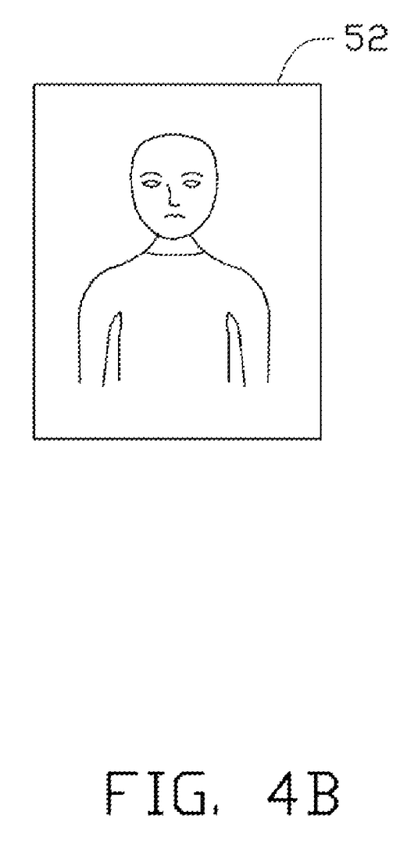

Referring to FIG. 3 and FIGS. 4A-4B, the low-resolution camera 10 and the high-resolution camera 20 capture a person 50 simultaneously, to obtain the low resolution image 51 and the high resolution image 52 respectively. The low resolution image 51 and the high resolution image 52 have same content but different image size. The image size of the low resolution image 51 is smaller than the image size of the high resolution image 52.

Figure 5:
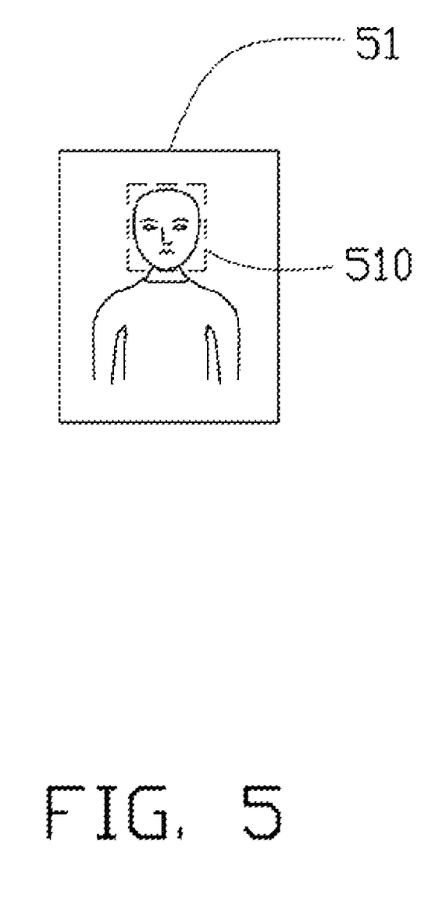
FIG. 5 is a schematic diagram of the image from the first camera after being detected by the detecting module.

Referring to FIG. 5, the detecting module 301 detects the low resolution image 51, to obtain a reference image, such as a facial image 510 in the low resolution image 51. The coordinate determining module 302 calculates the facial image 510 in the low resolution image 51, to determine coordinates of the facial image 510 in the low resolution image 51. The coordinate determining module 302 further determines coordinates of a facial image in the high resolution image 52. Supposing that a coordinate of a center of the low resolution image 51 is (0, 0), and the high resolution image 52 is two times bigger than the low resolution image 51 in the image size. The coordinate determining module 302 determines that the coordinates of the facial image 510 in the low resolution image 51 are (1, 1), (1, −1), (−1, −1), and (−1, 1), the coordinates of the facial in the high resolution image 52 are (2, 2), (2, −2), (−2, −2), and (−2, 2).

The editing module 303 selects a reference image which have the coordinates (2, 2), (2, −2), (−2, −2), and (−2, 2), in the high resolution image 52. The editing module 303 crops and resizes the reference image according to the ratio of the image size between the low resolution image 51 and the high resolution image 52. Thus the cropped reference image has a same image size with the facial image 510 in the low resolution image 51. The reference image is to replace the facial image 510 in the low resolution image 51, to obtain the new image. As a result, the reference image has high resolution in the new image. The identifying module 304 identifies the new image, to ensure whether the facial image in the new image is the same with a facial image in the standard image.

Figure 6:
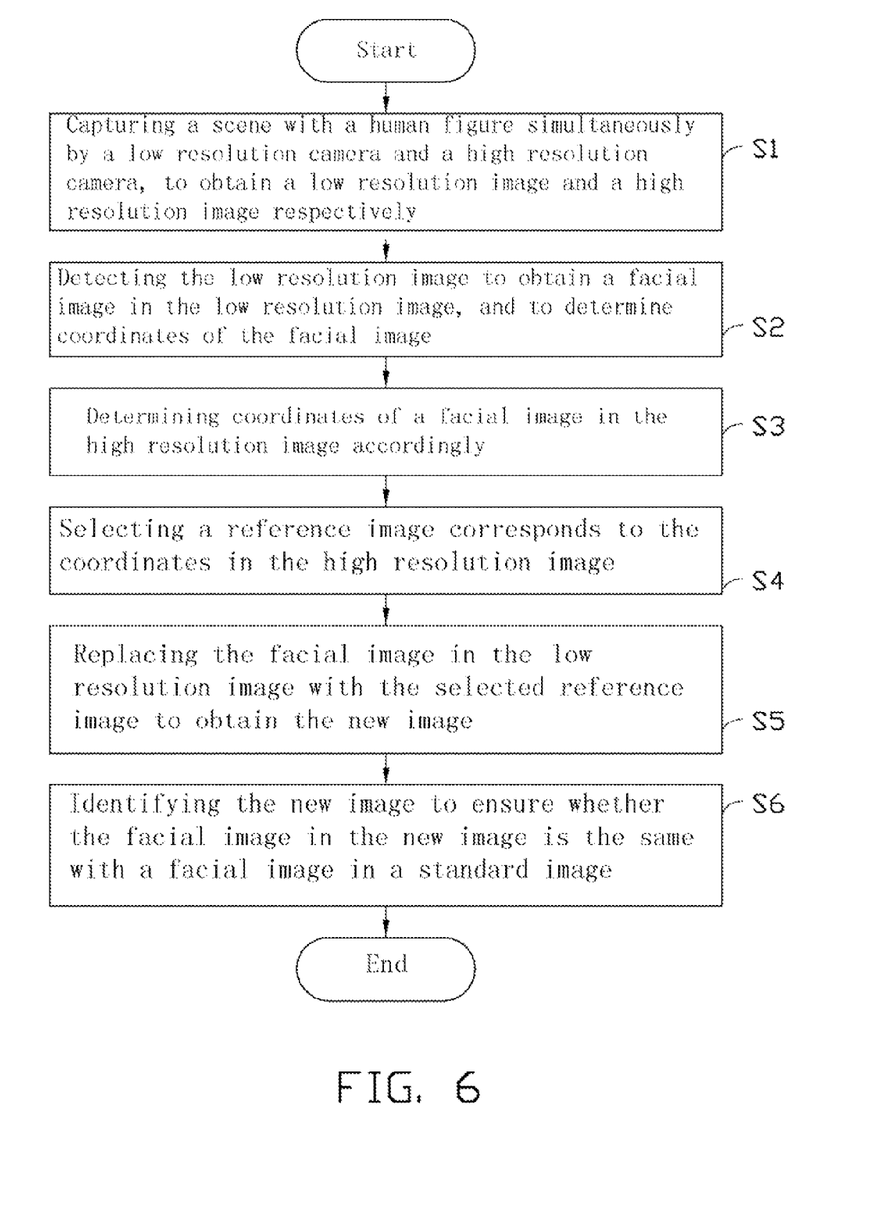
FIG. 6 is a flowchart of an exemplary embodiment of a surveilling method.

Referring to FIG. 6, an exemplary embodiment of a surveilling method includes the following steps.

In step S1, the low resolution camera 10 and the high resolution camera 20 capture the scene 50 with a human figure simultaneously, to obtain the low resolution image 51 and the high resolution image 52, respectively. The low resolution image 51 and the high resolution image 52 have the same content but different image size. The image size of the low resolution image 51 is smaller than the image size of the high resolution image 52.

In step S2, the detecting module 301 detects the low resolution image 51, to obtain the reference image, such as the facial image 510 in the low resolution image 51.

In step S3, the coordinate determining module 302 further determines coordinates of a facial image in the high resolution image 52. Supposing that a coordinate of a center of the low resolution image 51 is (0, 0), and the high resolution image 52 is two times bigger than the low resolution image 51 in the image size. The coordinate determining module 302 determines that the coordinates of the facial image 510 in the low resolution image 51 are (1, 1), (1, −1), (−1, −1), and (−1, 1), the coordinates of the facial image in the high resolution image 52 are (2, 2), (2, −2), (−2, −2), and (−2, 2).

In step S4, the editing module 303 selects a reference image which has the coordinates (2, 2), (2, −2), (−2, −2), and (−2, 2), in the high resolution image 52. The selected reference image is the facial image in the high resolution image 52. The editing module 303 crops and resizes the selected reference image, to make the selected reference image after being cropped and resized is same with the facial image 510 in the low resolution image in the image size.

In step S5, the editing module 303 replaces the facial image 510 in the low resolution image 51 with the selected reference image, to obtain the new image.

In step S6, the identifying module 304 identifies the new image, to ensure whether the facial image in the new image is the same with the facial image in the standard image. It can be understood that the identifying module 304 compares pixel values of the new image and the standard image, to determine whether the two facial images in the two images are different.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A surveillance system, comprising:
   a low-resolution camera to capture a scene to obtain a low resolution image;
   a high-resolution camera to capture the same scene to obtain a high resolution image, wherein the low resolution image has a same content with the high resolution image, and an image size of the low resolution image is smaller than an image size of the high resolution image;
   a processing unit; and
   a storage unit connected to the processing unit and storing a plurality of modules to be executed by the processing unit, wherein the plurality of modules comprise:
      a detecting module to check the low resolution image to find a reference image in the low resolution image;
      a coordinate determining module to determine coordinates of the reference image in the low resolution image, and coordinates of a corresponding reference image in the high resolution image according to a ratio of the image sizes of the low resolution image and the high resolution image;
      an editing module to select the reference image in the high resolution image according to the coordinates of the reference image in the high resolution image, crop and resize the selected reference image according to the ratio of the image sizes of the low resolution image and the high resolution image, and replace the reference image in the low resolution image with the cropped and resized reference image to obtain a new image; and
      an identifying module to compare the cropped and resized reference image in the new image with a standard image to determine whether the two images are different.

2. The surveillance system of claim 1, wherein the detecting module is a face detecting module, the reference image is a facial image.

3. The surveillance system of claim 1, wherein the detecting module is a license plate detecting module, the reference image is a license plate.

4. A surveilling method comprising:
   capturing a scene by a low-resolution camera and a high-resolution camera simultaneously to obtain a low resolution image and a high resolution image respectively, wherein an image size of the low resolution image is smaller than an image size of the high resolution image;
   detecting the low resolution image to obtain a reference image in the low resolution image, and to determine coordinates of the reference image in the low resolution image;
   determining coordinates of the corresponding reference image in the high resolution image according to a ratio of the image sizes of the low resolution image and the high resolution image;
   selecting the reference image with the coordinates of the reference image in the high resolution image;
   cropping and resizing the selected reference image according to the ratio of the image sizes of the low resolution image and the high resolution image;

replacing the reference image in the low resolution image with the cropped and resized reference image to obtain a new image; and comparing the cropped and resized reference image in the new image with a standard image to determine whether the two images are different.

5. The surveilling method of claim 4, wherein the step of determining coordinates of the reference image in the high resolution image comprises:

defining coordinates of centers of the low resolution image and the high resolution image are (0, 0);

determining the ratio of the image size between the low resolution image and the high resolution image; and multiplying the coordinates of the reference image in the low resolution image with the ratio of the image size to obtain the coordinates of the reference image in the high resolution image.

6. The surveilling method of claim 4, wherein the step of identifying the new image comprises:

comparing pixel values of the cropped and resized reference image in the new image and the standard image to determine whether the two images are different.

7. The surveilling method of claim 4, wherein the detecting module is a face detecting module, the reference image is a facial image.

8. The surveilling method of claim 4, wherein the detecting module is a license plate detecting module, the reference image is a license plate.

* * * * *